US011843403B2

(12) United States Patent
Rana et al.

(10) Patent No.: US 11,843,403 B2
(45) Date of Patent: Dec. 12, 2023

(54) RADIO COORDINATION IN WIRELESS COMMUNICATION SYSTEMS

(71) Applicant: Apple Inc., Cupertino, CA (US)

(72) Inventors: Shehla Rana, Cupertino, CA (US); Yang Yu, Cupertino, CA (US); Rajneesh Kumar, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 125 days.

(21) Appl. No.: 17/484,620

(22) Filed: Sep. 24, 2021

(65) Prior Publication Data

US 2022/0103194 A1 Mar. 31, 2022

Related U.S. Application Data

(60) Provisional application No. 63/083,707, filed on Sep. 25, 2020.

(51) Int. Cl.
*H04B 1/04* (2006.01)
*H04W 76/15* (2018.01)

(52) U.S. Cl.
CPC .......... *H04B 1/0483* (2013.01); *H04W 76/15* (2018.02); *H04B 2001/0408* (2013.01)

(58) Field of Classification Search
CPC .......... H04B 1/04; H04B 1/0483; H04B 1/38; H04B 1/3805; H04B 1/40; H04B 1/401; H04B 1/406; H04B 1/44; H04W 76/00; H04W 76/10; H04W 76/15; H04W 76/16
See application file for complete search history.

(56) References Cited

U.S. PATENT DOCUMENTS

| 8,265,563 B2* | 9/2012 | Beninghaus | H04B 1/3805 455/226.1 |
| 8,514,798 B2* | 8/2013 | Lee | H04B 1/406 370/338 |
| 8,908,667 B1* | 12/2014 | Wong | H04B 1/04 370/327 |
| 9,002,282 B1* | 4/2015 | de la Broise | H04B 1/40 455/553.1 |
| 2015/0264520 A1* | 9/2015 | Beauregard | H04W 4/02 455/456.1 |
| 2017/0208623 A1* | 7/2017 | Bate | H04W 72/1215 |

* cited by examiner

*Primary Examiner* — Quochien B Vuong
(74) *Attorney, Agent, or Firm* — Fish & Richardson P.C.

(57) ABSTRACT

Disclosed are methods, systems, and computer-readable medium to perform operations in a wireless device that includes a first radio that operates according to a first wireless protocol and a second radio that operates according to a second wireless protocol. The operations include determining that the first radio has received a grant to an antenna of the wireless device, where the wireless device further includes a secondary radio configured to perform actions according to the first and second wireless protocols. The operations also include selecting the first radio or the secondary radio to perform an action according to the first wireless protocol. Further, the operations include instructing the selected one of the first radio and the secondary radio to perform the action, thereby avoiding conflict between the primary radio and the secondary radio.

20 Claims, 6 Drawing Sheets

FIG. 5

RADIO COORDINATION IN WIRELESS COMMUNICATION SYSTEMS

CLAIM OF PRIORITY

This application claims priority to U.S. Provisional Patent Application No. 63/083,707 filed Sep. 25, 2020, entitled "RADIO COORDINATION IN WIRELESS COMMUNICATION SYSTEMS," the entirety of which is incorporated herein by reference.

TECHNICAL FIELD

This disclosure relates to radio coordination in wireless communication systems.

BACKGROUND

A wireless communication system of an electronic device includes radios (e.g., chipset radios) that provide the electronic device with wireless communication capabilities. Each radio enables the electronic device to communicate using a particular wireless protocol. For example, a Wi-Fi radio enables communication using a Wi-Fi protocol and a Bluetooth radio enables communication using a Bluetooth protocol.

SUMMARY

The radios of a wireless communication system are communicatively coupled to an antenna of the electronic device through a data path in order to transmit/receive (Tx/Rx) wireless signals via the antenna. In order to transmit/receive wireless signals, the radios contend for grant, from a coexistence arbitrator, to access the antenna. Once a radio receives grant, the radio can control settings of the data path (e.g., amplifier settings) and/or the antenna in order to optimize for communicating wireless signals according to the radio's wireless protocol. For example, when a Wi-Fi radio receives grant, the Wi-Fi radio can control the data path settings and/or the antenna in order to optimize the data path and/or the antenna for communicating Wi-Fi signals.

In addition to radios that are dedicated to specific wireless protocols (e.g., Wi-Fi and Bluetooth radios), recent wireless communication systems also include a secondary radio that supplements the dedicated radios (also referred to as primary radios or main cores). The secondary radio is a receive-only radio that performs Rx functions associated with one or more wireless protocols. For example, the secondary radio can perform both Wi-Fi and Bluetooth functions. The secondary radio, which consumes significantly less power than primary radios, is referred to as a low power scan radio (LPSR). Given that the LPSR consumes significantly less power than primary radios, it is desirable to increase the usage of the LPSR, e.g., for power saving purposes.

However, the LPSR shares the data path to the antenna with primary radios. Because the primary radios control the data path settings and/or the antenna, conflicts may occur between the primary radios and the LPSR. In existing wireless communication systems, conflicts between radios are resolved using the coexistence arbitrator. For example, the coexistence arbitrator determines which primary radio has grant to control the antenna.

However, the coexistence arbitrator only takes into consideration primary radios and does not consider LPSR operations. As a result, primary radio operations can conflict with, and disrupt, LPSR operations. As an example, Tx activity in a primary radio can cause deafness in the LPSR since the primary radio optimizes the path for Tx activity as opposed to Rx activity. Thus, an attempt to use the LPSR while there is Tx activity in the primary radio will result in failure. As another example, while a primary radio of a first wireless protocol has grant, the LPSR may be scheduled to receive a wireless signal of a different wireless protocol, which can degrade the signal received by the LPSR. For instance, while a Bluetooth primary radio has grant, the LPSR may be scheduled to receive a Wi-Fi signal. The LPSR receives a degraded Wi-Fi signal since the Bluetooth primary radio has adjusted the path settings and/or the antenna to be optimized for receiving Bluetooth signals (and not Wi-Fi signals). As yet another example, frequent Rx activity on a primary radio can degrade LPSR reliability due to frequent gain changes and toggles on the data path. As illustrated by these examples, primary radio operations can disrupt LPSR operations without warning. Thus, while it is desirable to increase the usage of the LPSR for power saving purposes, this goal cannot be achieved in existing wireless communication systems.

This disclosure describes methods and systems for coordination between primary radios and a secondary radio in a wireless communication system. In particular, the disclosed methods and systems proactively avoid conflicts between the primary radios and the secondary radio. In an embodiment, a primary radio is configured to be responsible for actions associated with a wireless protocol of the primary radio. Once the primary radio receives grant from a coexistence arbitrator to access the antenna, the primary radio can determine whether to use the primary radio or the secondary radio to perform an action. For example, a Wi-Fi primary radio is responsible for Wi-Fi actions to be performed by the wireless communication system. Once the Wi-Fi primary radio receives grant, the Wi-Fi primary radio determines whether to use the Wi-Fi primary radio or the secondary radio for a Wi-Fi action (e.g., transmitting or receiving a Wi-Fi signal). The determination of whether to use the primary or the secondary radio is based on one or more factors, such as a priority of the action or a type of the action.

Aspects of the subject matter described in this specification may be embodied in methods to be performed in a wireless device that includes a first radio that operates according to a first wireless protocol and a second radio that operates according to a second wireless protocol. The methods include the actions of determining that the first radio has received a grant to an antenna of the wireless device, where the wireless device further includes a secondary radio configured to perform actions according to the first and second wireless protocols; selecting the first radio or the secondary radio to perform an action according to the first wireless protocol; and instructing the selected one of the first radio and the secondary radio to perform the action, thereby avoiding conflict between the primary radio and the secondary radio.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the secondary radio is a low power receive-only radio.

In some implementations, the first wireless protocol is Wi-Fi, and the second wireless protocol is Bluetooth.

In some implementations, the secondary radio shares the data path to the antenna with the primary radio.

In some implementations, the actions further include determining at least one of amplifier settings of an amplifier on the data path or antenna settings.

In some implementations, selecting the first radio or the secondary radio to perform the action is based on at least one of a priority of the action, a type of the action, or a power consumption of the action.

In some implementations, the second radio is on hold until the second radio receives the grant to the antenna.

In some implementations, determining that the first radio has received the grant to the antenna involves receiving the grant from a coexistence arbitrator.

Aspects of the subject matter described in this specification may also be embodied in methods to be performed in a wireless device, the methods involving determining that a first radio has received a grant to an antenna of the wireless device, where the first radio operates according to a first protocol, and where the wireless device comprises a secondary radio configured to perform actions according to the first protocol; selecting the first radio or the secondary radio to perform an action according to the first wireless protocol; and instructing the selected one of the first radio and the secondary radio to perform the action, thereby avoiding conflict between the first radio and the secondary radio.

The previously-described implementation is applicable using a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium. These and other embodiments may each optionally include one or more of the following features.

In some implementations, the secondary radio is a low power receive-only radio.

In some implementations, the first wireless protocol is Wi-Fi.

In some implementations, the secondary radio shares a data path to the antenna with the first radio.

In some implementations, the method further involving determining at least one of amplifier settings of an amplifier on the data path or antenna settings.

In some implementations, determining that the first radio has received the grant to the antenna involves receiving the grant from a coexistence arbitrator of the wireless device.

The subject matter described in this specification can be implemented to realize one or more of the following advantages. The disclosed method enables conflict-free primary and secondary radio operation in a wireless communication system. The disclosed method is a proactive measure as opposed to the existing reactive measures taken in response to conflict between a primary radio and a secondary radio. The disclosed method also provides implicit protection for secondary radio operations. Without protection of secondary radio operations, failure of secondary radio operations is discovered only after-the-fact. By then, power costs are incurred for operating the secondary radio and a delay in executing a failed operation occurs. Additionally, the disclosed method increases the reliability of the low power secondary radio operations, which increases usage of the secondary radio. Increasing the usage of the secondary radio in turn improves the power efficiency of the wireless communication system. Furthermore, the disclosed method does not pose any new risks to the access patterns of Bluetooth operation compared to existing system. Thus, while the performance of secondary radio operation will improve, there is no risk to legacy Bluetooth operations.

The details of one or more implementations of the subject matter described in this disclosure are set forth in the accompanying drawings and the description. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This disclosure describes methods and systems for proactively avoiding conflicts between primary radios and a secondary radio in a wireless communication system. In an embodiment, a primary radio contends for the needs associated with the wireless protocol of the primary radio. Once the primary radio receives grant to access an antenna, the primary radio can determine whether to use the primary radio or the secondary radio for an action. For example, a Wi-Fi primary radio contends on behalf of Wi-Fi needs. Once the Wi-Fi primary radio receives grant to access the antenna, the Wi-Fi primary radio selects either the Wi-Fi primary radio or the secondary radio to use for a Wi-Fi function. The radio selection is based on one or more factors, such as a priority of the function, a type of the function, or a power consumption of the function.

Figure 1A:
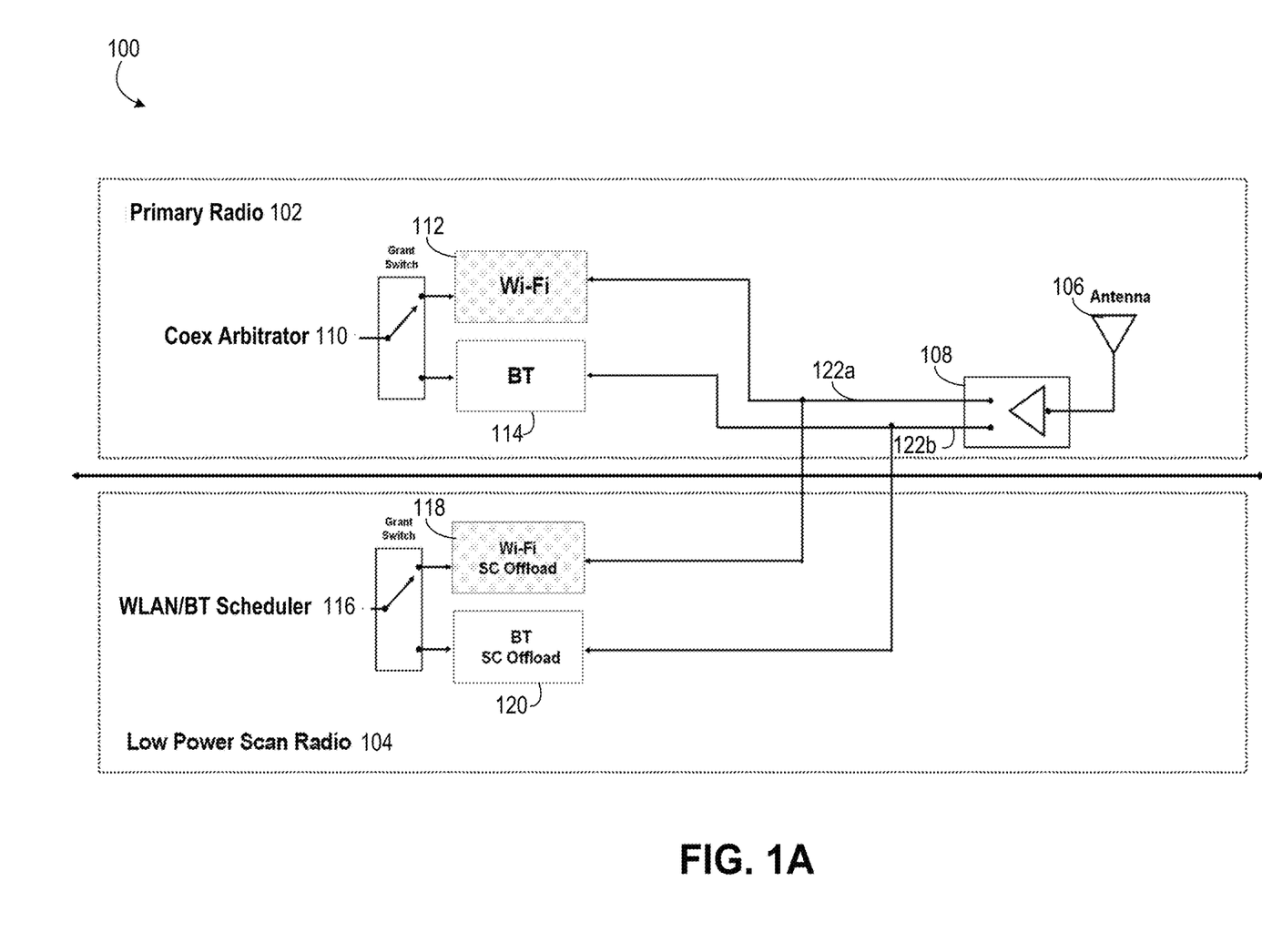
FIG. 1A and FIG. 1B each illustrate an example wireless communication system, according to some implementations of the present disclosure.

FIG. 1A illustrates a wireless communication system 100, according to some implementations. As shown in FIG. 1A, the wireless communication system 100 includes a primary radio 102 (also referred to as a "main core 102") and a low power scan radio (LPSR) 104. In this example, the primary radio 102 includes a coexistence arbitrator 110, a Wi-Fi radio 112, a Bluetooth radio 114, an antenna 106, and an amplifier 108 (e.g., an external low noise amplifier [eLNA]). As also shown in FIG. 1A, the Wi-Fi radio 112 and the Bluetooth radio 114 are communicatively coupled to the antenna 106 via paths 122a, 122b, respectively. Note that the wireless communication system 100 is shown for illustration purposes only, as the wireless communication system 100 may include other components without departing from the scope of the disclosure. For example, the wireless communication system 100 may include other types of primary and/or secondary radios. Furthermore, the wireless communication system 100 may be included in a computing system, such as the computing system 500 of FIG. 5.

In an embodiment, the Wi-Fi radio 112 and the Bluetooth radio 114 use the antenna 106 in order to transmit or receive wireless signals. In order to avoid conflict between the radios, the coexistence arbitrator 110 controls which radio receives grant to the antenna 106. In this arrangement, the Wi-Fi radio 112 and the Bluetooth radio 114 contend for grant to the antenna 106. The coexistence arbitrator 110 then selects which radio receives grant to the antenna 106. The radio that wins the grant can control the antenna gain and/or the amplifier settings in order to optimize signal transmission/reception appropriate for the winning radio's own need. For example, when the Wi-Fi radio 112 wins the grant, the Wi-Fi radio can control the antenna gain and/or the amplifier settings in order to optimize for Wi-Fi signal transmission/reception.

In an embodiment, the LPSR 104 can be used either for Wi-Fi functions (also referred to as Wi-Fi secondary core (SC) offload) or Bluetooth functions (also referred to as BT SC offload). The dual functionality of the LPSR 104 is depicted in FIG. 1A by Wi-Fi SC Offload 118 and BT SC Offload 120. As shown in FIG. 1A, the Wi-Fi SC Offload 118 and BT SC Offload 120 share paths 122a, 122b with the Wi-Fi radio 112 and the Bluetooth radio 114, respectively. Additionally, the LPSR 104 includes a WLAN/BT scheduler 116 that controls which of the Wi-Fi SC Offload 118 and the BT SC Offload 120 receives a signal from the antenna 106. However, even though the WLAN/BT scheduler 116 controls which entity receives the signal, the Rx path is optimized by the primary radio winner of the grant from the coexistence arbitrator 110. Thus, the signal received by the LPSR 104 is optimized according to the settings selected by the primary radio 102.

In scenarios where the primary radio 102 and the LPSR 104 are receiving signals using the same wireless protocol, a conflict does not exist between the primary radio 102 and the LPSR 104. Such a scenario is illustrated in FIG. 1A. As shown by the switch of the coexistence arbitrator 110, the Wi-Fi radio 112 has grant to use the antenna 106. As such, the settings of the antenna 106 and/or the settings of the amplifier 108 are controlled by the Wi-Fi radio 112 to be optimized for Wi-Fi signals. And as shown by the switch of the WLAN/BT scheduler 116, the Wi-Fi SC Offload 118 is also receiving a Wi-Fi signal via the antenna 106. Because the Wi-Fi radio 112 has optimized the settings for Wi-Fi signals, the signal that is received by the LPSR 104 is not affected by the primary radio 102. Conversely, in scenarios where the primary radio 102 and the LPSR 104 are receiving signals using different wireless protocols, a conflict arises between the primary radio 102 and the LPSR 104. Such a scenario is illustrated in FIG. 1B.

Figure 1B:
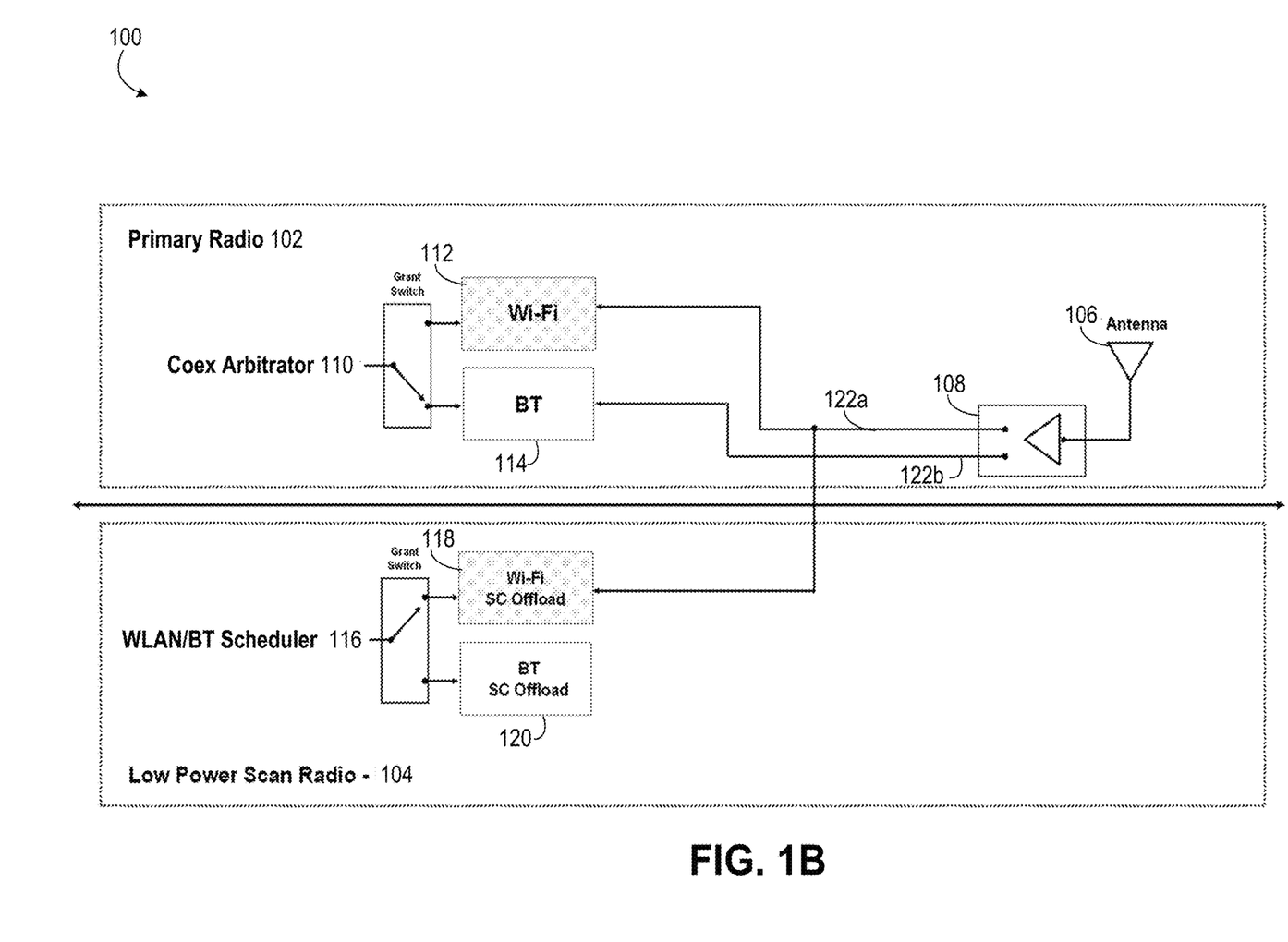

FIG. 1B illustrates an example scenario of conflict arising between the primary radio 102 and the LPSR 104, according to some implementations. In FIG. 1B, as shown by the switch of the coexistence arbitrator 110, the Bluetooth radio 114 has grant to use the antenna 106. As such, the settings of the antenna 106 and/or the settings of the amplifier 108 are controlled by the Bluetooth radio 114 to be optimized for Bluetooth signals. However, as shown by the switch of the WLAN/BT scheduler 116, the Wi-Fi SC Offload 118 is receiving a Wi-Fi signal via the antenna 106. Because the Bluetooth radio 114 has optimized the settings for Bluetooth signals, the signal that is received by the LPSR 104 is affected by the primary radio 102.

Figure 2:
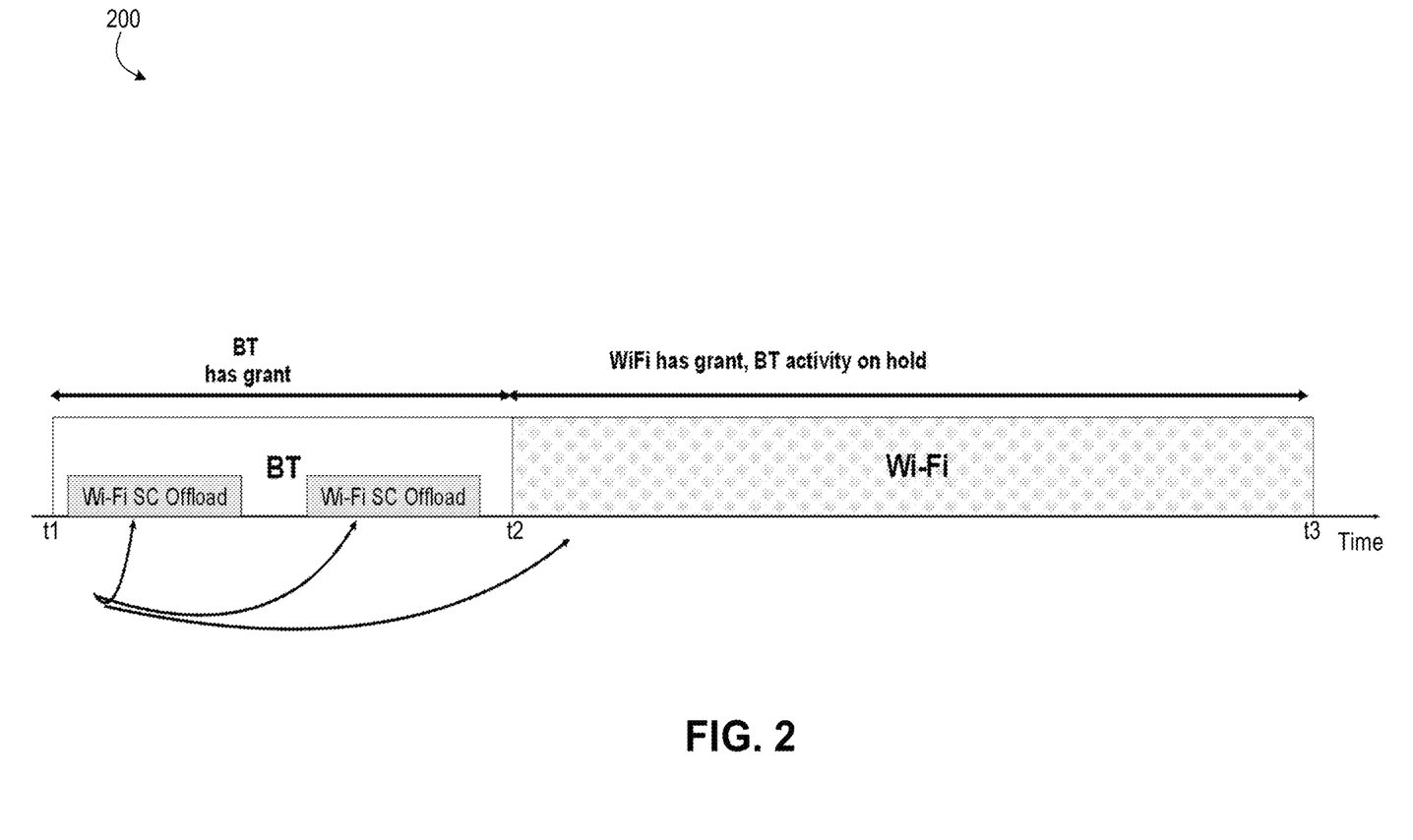
FIG. 2 illustrates an example of conflicted primary and secondary radio operation, according to some implementations of the present disclosure.

FIG. 2 illustrates an example 200 of conflicted primary and secondary radio operation, according to some implementations. In example 200, the Bluetooth primary radio has received grant to control the antenna during a time period from t1 to t2. During this time period, the LPSR attempts Wi-Fi SC offload multiple times. However, due to the Bluetooth radio controlling the settings during this time period, the signals that are received by the LPSR are unreliable since the settings are optimized for Bluetooth signals (and not Wi-Fi signals). Because the LPSR fails to perform Wi-Fi SC offload multiple times, LPSR may no longer be used. As a result, LPSR may not be used when the primary Wi-Fi radio has grant (e.g., during the time period from t2 to t3) even though Bluetooth activity is on hold during this period (and therefore the Bluetooth radio cannot adjust the settings). Thus, the existing coexistence arbitrator 110 does not prevent disruptions to LPSR operations. Additionally, existing systems do not have knowledge that it is actually safe to use low power scan core.

Disclosed herein are methods and systems for proactively avoiding conflicts between primary radios and a secondary radio in a wireless communication system, such as the wireless communication system 100. In an embodiment, a primary radio is responsible for the needs associated with the wireless protocol of the primary radio. Once the primary radio receives grant from the coexistence arbitrator to perform a function of the wireless protocol, the primary radio determines whether to use the primary radio or the secondary radio for that function. Under this design, the coexistence arbitrator provides a grant to the primary radio. The primary radio and the LPSR coordinate among themselves to carry out operations of the wireless protocol without disruption from other primary radios. The radio (i.e., primary or secondary) that executes the functions will be invisible to the coexistence arbitrator.

To illustrate this design, consider the wireless communication system 100 of FIG. 1A. In an embodiment, the Wi-Fi radio 112 is configured to contend for grant from the coexistence arbitrator 110 on behalf of all Wi-Fi functions. For example, the Wi-Fi radio 112 contends for grant to receive a Wi-Fi signal. Once the Wi-Fi radio 112 receives grant, the Wi-Fi radio 112 selects either the Wi-Fi radio 112 or the Wi-Fi SC Offload 118 to receive the Wi-Fi signal. Thus, the Wi-Fi radio 112 and the LPSR 104 coordinate among themselves to carry out Wi-Fi operations without disruption from the Bluetooth radio 114. Additionally, LPSR operations are carried out with high reliability due to explicit antenna grant for Wi-Fi and due to Bluetooth radio 114 being on hold until the Bluetooth radio 114 wins antenna grant.

In an embodiment, the selection of the radio to perform the desired function is based on one or more factors, such as a priority of the function, a type of the function, or a power consumption of the function. For example, in the case of Wi-Fi, connectivity-critical functions like beacon reception are designated as high priority. Thus, these functions can be offloaded to LPSR to save power.

Figure 3:
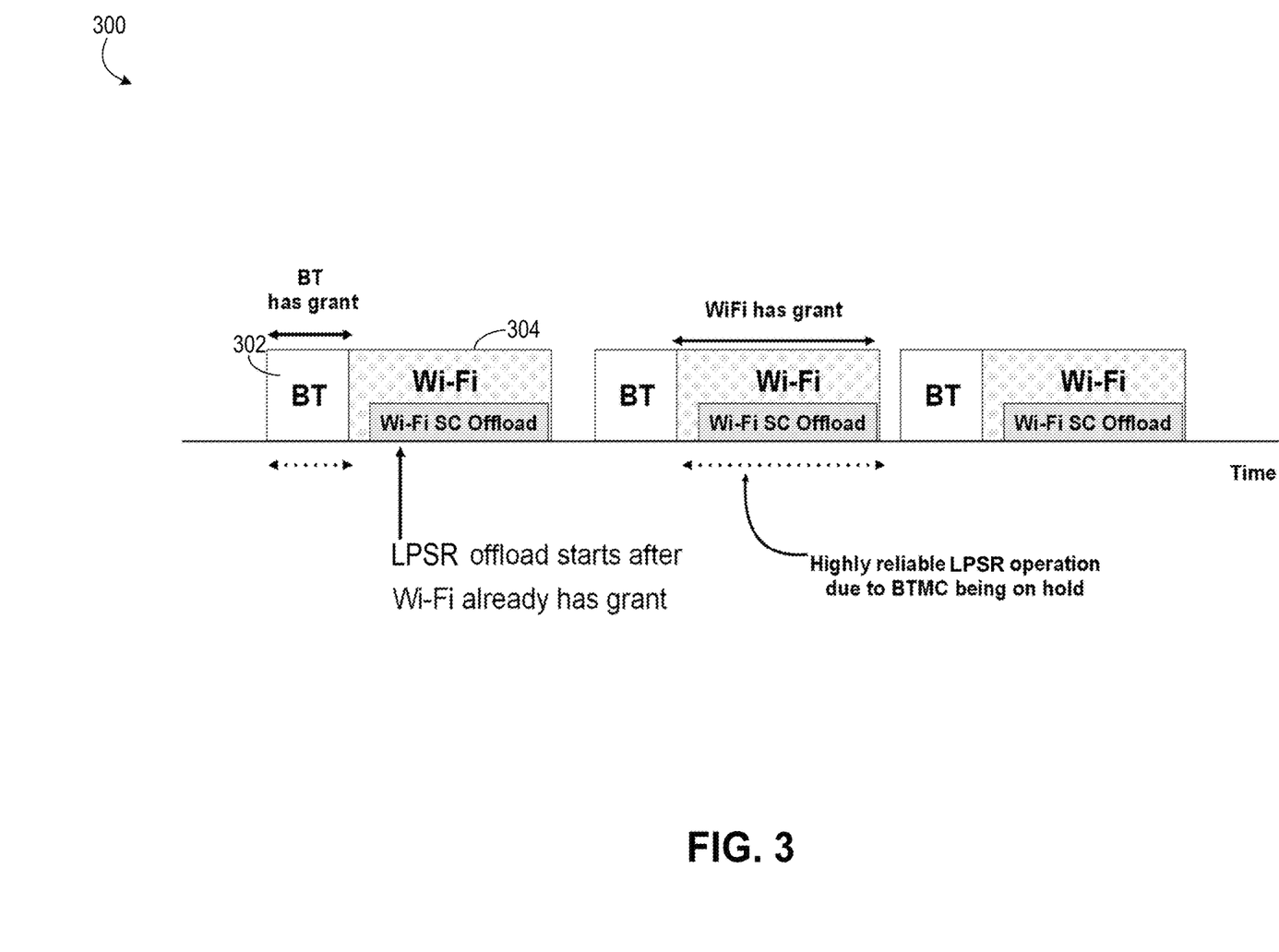
FIG. 3 illustrates an example of conflict-free primary and secondary radio operation, according to some implementations of the present disclosure.

FIG. 3 illustrates an example 300 of conflict-free primary and secondary radio operation, according to some implementations. In this example, the wireless communication system includes a Bluetooth primary radio, a Wi-Fi primary radio, and a LPSR that is configured to perform Bluetooth and Wi-Fi functions. As shown in FIG. 3, the Bluetooth primary radio receives grant 302. During this time period, LPSR is not used for Wi-Fi functions since the Wi-Fi primary radio, which is responsible for all Wi-Fi functions, does not have grant. Additionally, during this time period, the LPSR can perform Bluetooth functions, which do not conflict with operations of the Bluetooth primary radio. The Wi-Fi primary radio subsequently receives grant 304. During the time period of the grant 304, the Wi-Fi primary can determine to use the LPSR for Wi-Fi functions (i.e., Wi-Fi SC Offload). The LPSR Wi-Fi operations that are scheduled during the Wi-Fi grant are highly reliable due to the Bluetooth radio being on hold.

Figure 4:
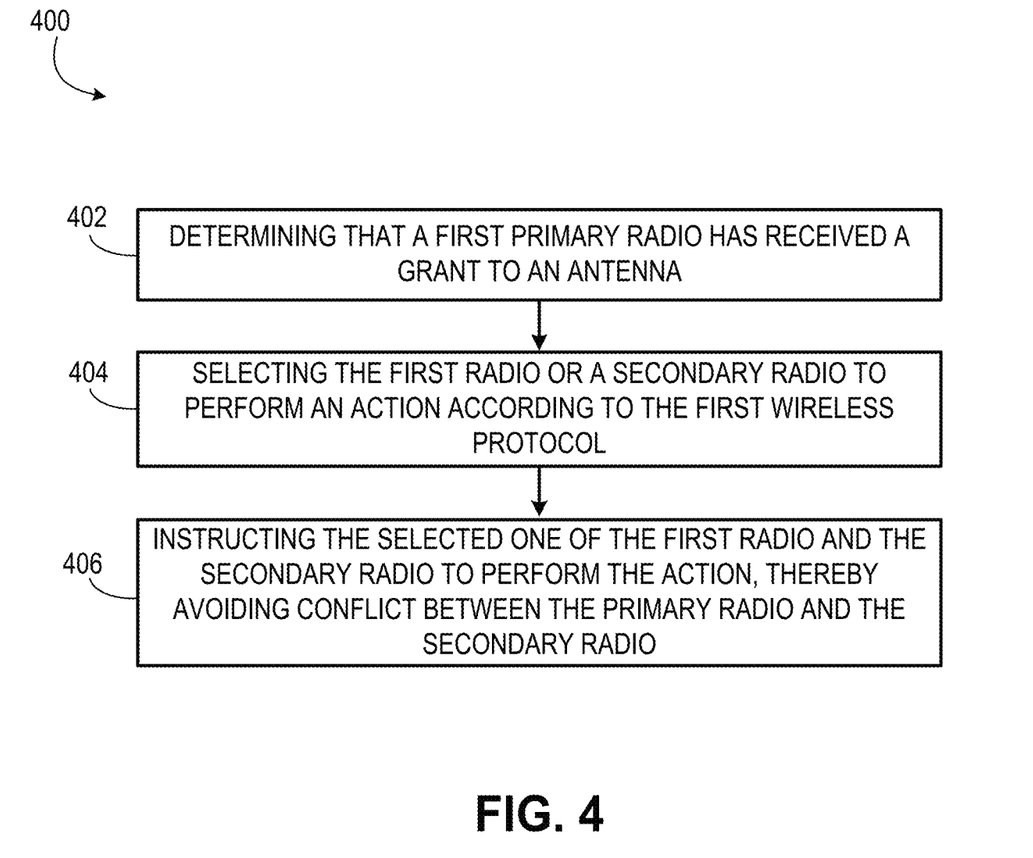
FIG. 4 illustrates a flowchart of an example method, according to some implementations of the present disclosure.

FIG. 4 illustrates a flowchart of an example method 400, according to some implementations of the present disclosure. The method 400 can be performed by a primary radio in a wireless communication system. For clarity of presentation, the description that follows generally describes method 400 in the context of the other figures in this description. However, it will be understood that method 400 can be performed, for example, by any suitable system, environment, software, hardware, or a combination of systems, environments, software, and hardware, as appropriate. In some implementations, various steps of method 400 can be run in parallel, in combination, in loops, or in any order.

At step 402, method 400 involves determining that a first radio of a primary radio has received a grant to an antenna. The primary radio is communicatively coupled to the antenna via a data path. The primary radio includes the first radio that operates according to a first wireless protocol and a second radio that operates according to a second wireless protocol. Further, the first radio and the second radio contend for grant to access the antenna. In an example, the primary radio is the primary radio 102 of FIG. 1A, the first radio is the Wi-Fi radio 112, the second radio is the Bluetooth radio 114, the first wireless protocol is Wi-Fi, the second wireless protocol is Bluetooth, and the antenna is the antenna 106.

At step 404, method 400 involves selecting the first radio or a secondary radio to perform an action according to the first wireless protocol. The action may be a receiving a wireless signal according to the first wireless protocol (e.g., receiving a Wi-Fi signal). The secondary radio is configured to perform actions according to the first and second wireless protocols. In an example, the secondary radio is the LPSR 104 that is configured to perform Wi-Fi functions (e.g., Wi-Fi SC Offload 118) and Bluetooth functions (e.g., BT SC Offload 120).

At step 406, method 400 involves instructing the selected one of the first radio and the secondary radio to perform the action, thereby avoiding conflict between the primary radio and the secondary radio.

In some implementations, the secondary radio is a low power receive-only radio.

In some implementations, the first wireless protocol is Wi-Fi, and the second wireless protocol is Bluetooth.

In some implementations, the secondary radio shares the data path to the antenna with the primary radio.

In some implementations, the actions further include determining at least one of antenna settings or amplifier settings of an amplifier on the data path.

In some implementations, selecting the first radio or the secondary radio to perform the action is based on at least one of a priority of the action, a type of the action, or a power consumption of the action.

In some implementations, the second radio is on hold until the second radio receives the grant to the antenna.

In some implementations, determining that the first radio has received the grant to the antenna involves receiving the grant from a coexistence arbitrator.

Figure 5:
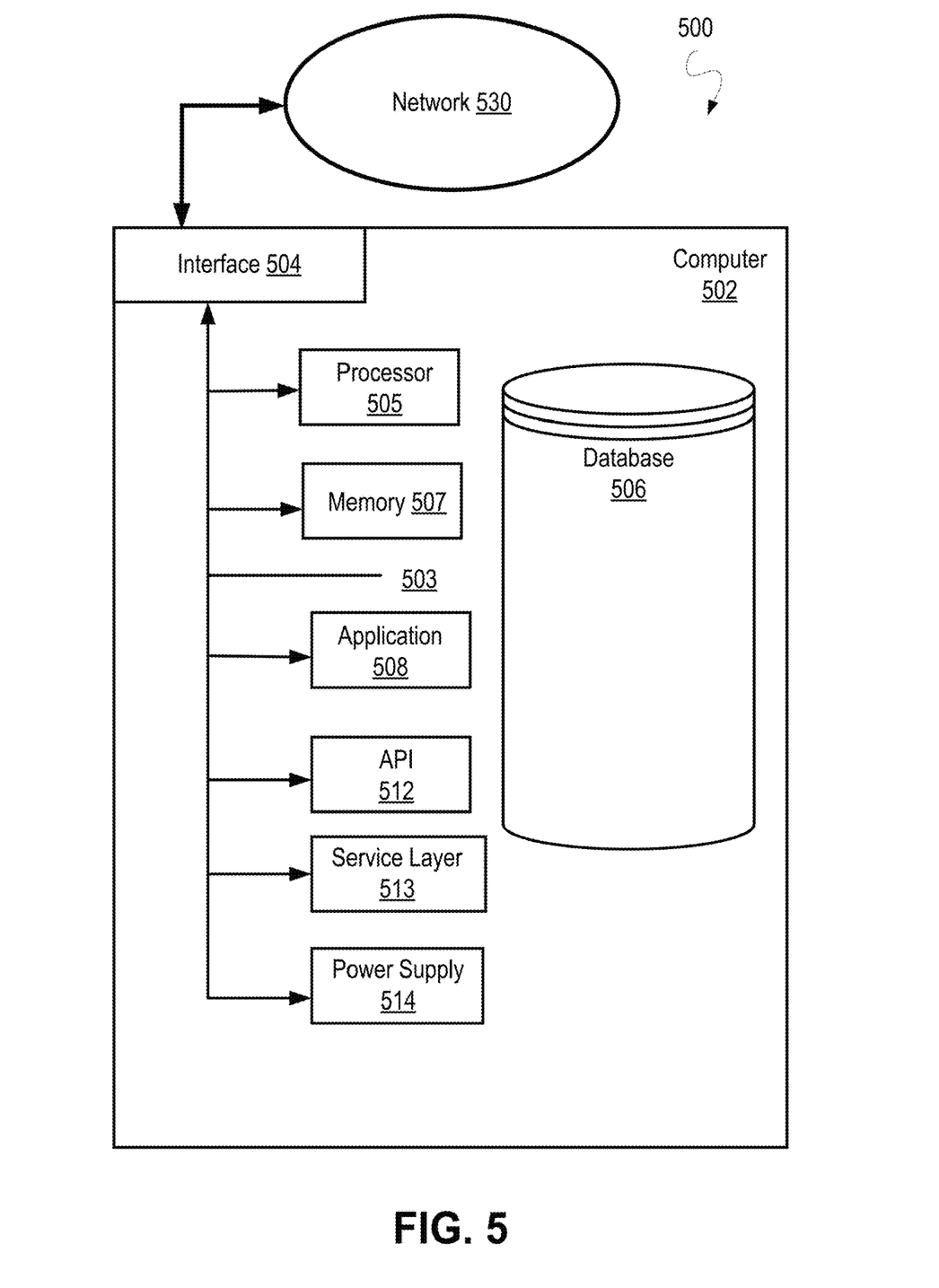
FIG. 5 illustrates an example computer system for implementing some of the disclosed embodiments or portion(s) thereof, according to some implementations of the present disclosure.

FIG. 5 is a block diagram of an example computer system 500 that can be used to provide computational functionalities associated with described algorithms, methods, functions, processes, flows, and procedures described in the present disclosure, according to some implementations of the present disclosure.

The illustrated computer 502 is intended to encompass any computing device such as a server, a desktop computer, embedded computer, a laptop/notebook computer, a wireless data port, a smart phone, a personal data assistant (PDA), a tablet computing device, or one or more processors within these devices, including physical instances, virtual instances, or both. The computer 502 can include input devices such as keypads, keyboards, and touch screens that can accept user information. Also, the computer 502 can include output devices that can convey information associated with the operation of the computer 502. The information can include digital data, visual data, audio information, or a combination of information. The information can be presented in a graphical user interface (UI) (or GUI). In some implementations, the inputs and outputs include display ports (such as DVI-I+2x display ports), USB 3.0, GbE ports, isolated DI/O, SATA-III (6.0 Gb/s) ports, mPCIe slots, a combination of these, or other ports. In instances of an edge gateway, the computer 502 can include a Smart Embedded Management Agent (SEMA), such as a built-in ADLINK SEMA 2.2, and a video sync technology, such as Quick Sync Video technology supported by ADLINK MSDK+. In some examples, the computer 502 can include the MXE-5400 Series processor-based fanless embedded computer by ADLINK, though the computer 502 can take other forms or include other components.

The computer 502 can serve in a role as a client, a network component, a server, a database, a persistency, or components of a computer system for performing the subject matter described in the present disclosure. The illustrated computer 502 is communicably coupled with a network 530. In some implementations, one or more components of the computer 502 can be configured to operate within different environments, including cloud-computing-based environments, local environments, global environments, and combinations of environments.

At a high level, the computer 502 is an electronic computing device operable to receive, transmit, process, store, and manage data and information associated with the described subject matter. According to some implementations, the computer 502 can also include, or be communicably coupled with, an application server, an email server, a web server, a caching server, a streaming data server, or a combination of servers.

The computer 502 can receive requests over network 530 from a client application (for example, executing on another computer 502). The computer 502 can respond to the received requests by processing the received requests using software applications. Requests can also be sent to the computer 502 from internal users (for example, from a command console), external (or third) parties, automated applications, entities, individuals, systems, and computers.

Each of the components of the computer 502 can communicate using a system bus. In some implementations, any or all of the components of the computer 502, including hardware or software components, can interface with each other or the interface 504 (or a combination of both), over the system bus. Interfaces can use an application programming interface (API), a service layer, or a combination of the API and service layer. The API can include specifications for routines, data structures, and object classes. The API can be either computer-language independent or dependent. The API can refer to a complete interface, a single function, or a set of APIs.

The service layer can provide software services to the computer 502 and other components (whether illustrated or not) that are communicably coupled to the computer 502. The functionality of the computer 502 can be accessible for all service consumers using this service layer. Software services, such as those provided by the service layer, can provide reusable, defined functionalities through a defined interface. For example, the interface can be software written in JAVA, C++, or a language providing data in extensible markup language (XML) format. While illustrated as an integrated component of the computer 502, in alternative implementations, the API or the service layer can be stand-alone components in relation to other components of the computer 502 and other components communicably coupled to the computer 502. Moreover, any or all parts of the API or the service layer can be implemented as child or sub-modules of another software module, enterprise application, or hardware module without departing from the scope of the present disclosure.

The computer 502 can include an interface 504. Although illustrated as a single interface 504 in FIG. 5, two or more interfaces 504 can be used according to particular needs, desires, or particular implementations of the computer 502 and the described functionality. The interface 504 can be used by the computer 502 for communicating with other systems that are connected to the network 530 (whether illustrated or not) in a distributed environment. Generally, the interface 504 can include, or be implemented using, logic encoded in software or hardware (or a combination of software and hardware) operable to communicate with the network 530. More specifically, the interface 504 can include software supporting one or more communication protocols associated with communications. As such, the network 530 or the interface's hardware can be operable to communicate physical signals within and outside of the illustrated computer 502.

The interface 504 may also include one or more antennas for communicating using one or more wireless communication protocols. In some cases, one or more parts of a receive and/or transmit chain may be shared between multiple wireless communication standards. For example, a device might be configured to communicate using either Bluetooth or Wi-Fi using partially or entirely shared wireless communication circuitry (e.g., using a shared radio or at least shared radio components). The shared communication circuitry may include a single antenna, or may include multiple antennas (e.g., for MIMO) for performing wireless communications.

Alternatively, the interface 504 may include separate transmit and/or receive chains (e.g., including separate antennas and other radio components) for each wireless communication protocol with which it is configured to communicate. As a further possibility, the computer 502 may include one or more radios or radio components which are shared between multiple wireless communication protocols, and one or more radios or radio components which are used exclusively by a single wireless communication protocol. For example, the computer 502 may include a shared radio for communicating using one or more of LTE, CDMA2000 1×RTT, GSM, and/or 5G NR, and separate radios for communicating using each of Wi-Fi and Bluetooth. Other configurations are also possible.

The computer 502 includes a processor 505. Although illustrated as a single processor 505 in FIG. 5, two or more processors 505 can be used according to particular needs, desires, or particular implementations of the computer 502 and the described functionality. Generally, the processor 505 can execute instructions and can manipulate data to perform the operations of the computer 502, including operations using algorithms, methods, functions, processes, flows, and procedures as described in the present disclosure.

The computer 502 can also include a database 506 that can hold data for the computer 502 and other components connected to the network 530 (whether illustrated or not). For example, database 506 can be an in-memory, conventional, or a database storing data consistent with the present disclosure. In some implementations, database 506 can be a combination of two or more different database types (for example, hybrid in-memory and conventional databases) according to particular needs, desires, or particular implementations of the computer 502 and the described functionality. Although illustrated as a single database 506 in FIG. 5, two or more databases (of the same, different, or combination of types) can be used according to particular needs, desires, or particular implementations of the computer 502 and the described functionality. While database 506 is illustrated as an internal component of the computer 502, in alternative implementations, database 506 can be external to the computer 502.

The computer 502 also includes a memory 507 that can hold data for the computer 502 or a combination of components connected to the network 530 (whether illustrated or not). Memory 507 can store any data consistent with the present disclosure. In some implementations, memory 507 can be a combination of two or more different types of memory (for example, a combination of semiconductor and magnetic storage) according to particular needs, desires, or particular implementations of the computer 502 and the described functionality. Although illustrated as a single memory 507 in FIG. 5, two or more memories 507 (of the same, different, or combination of types) can be used according to particular needs, desires, or particular implementations of the computer 502 and the described functionality. While memory 507 is illustrated as an internal component of the computer 502, in alternative implementations, memory 507 can be external to the computer 502.

An application can be an algorithmic software engine providing functionality according to particular needs, desires, or particular implementations of the computer 502 and the described functionality. For example, an application can serve as one or more components, modules, or applications. Multiple applications can be implemented on the computer 502. Each application can be internal or external to the computer 502.

The computer 502 can also include a power supply 514. The power supply 514 can include a rechargeable or non-rechargeable battery that can be configured to be either user- or non-user-replaceable. In some implementations, the power supply 514 can include power-conversion and management circuits, including recharging, standby, and power management functionalities. In some implementations, the power-supply 514 can include a power plug to allow the computer 502 to be plugged into a wall socket or a power source to, for example, power the computer 502 or recharge a rechargeable battery.

There can be any number of computers 502 associated with, or external to, a computer system including computer 502, with each computer 502 communicating over network 530. Further, the terms "client," "user," and other appropriate terminology can be used interchangeably, as appropriate, without departing from the scope of the present disclosure. Moreover, the present disclosure contemplates that many users can use one computer 502 and one user can use multiple computers 502.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification includes many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system comprising a computer memory interoperably coupled with a hardware processor configured to perform the computer-implemented method or the instructions stored on the non-transitory, computer-readable medium.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:
1. A system comprising:
an antenna;

a primary radio communicatively coupled to the antenna via a data path, the primary radio comprising a first radio that operates according to a first wireless protocol and a second radio that operates according to a second wireless protocol, wherein the first radio and the second radio contend for grant to access the antenna;

a secondary radio configured to perform actions according to the first and second wireless protocols; and at least one processor configured to perform operations comprising:

determining that the first radio has received a grant to the antenna;

selecting the first radio or the secondary radio to perform an action according to the first wireless protocol; and instructing the selected one of the first radio and the secondary radio to perform the action, thereby avoiding conflict between the primary radio and the secondary radio.

2. The system of claim 1, wherein the secondary radio is a low power receive-only radio.

3. The system of claim 1, wherein the first wireless protocol is Wi-Fi, and wherein the second wireless protocol is Bluetooth.

4. The system of claim 1, wherein the secondary radio shares the data path to the antenna with the primary radio.

5. The system of claim 1, wherein the operations further comprise:

determining at least one of amplifier settings of an amplifier on the data path or antenna settings.

6. The system of claim 1, wherein selecting the first radio or the secondary radio to perform the action is based on at least one of a priority of the action, a type of the action, or a power consumption of the action.

7. The system of claim 1, wherein the second radio is on hold until the second radio receives the grant to the antenna.

8. The system of claim 1, wherein determining that the first radio has received the grant to the antenna comprises:

receiving the grant from a coexistence arbitrator of the system.

9. A processor for a wireless device communicatively coupled to a first radio that operates according to a first wireless protocol and a second radio that operates according to a second wireless protocol, the processor comprising:

circuitry to execute one or more instructions that, when executed, cause the processor to perform operations comprising:

determining that the first radio has received a grant to an antenna of the wireless device, wherein the wireless device further comprises a secondary radio configured to perform actions according to the first and second wireless protocols;

selecting the first radio or the secondary radio to perform an action according to the first wireless protocol; and instructing the selected one of the first radio and the secondary radio to perform the action, thereby avoiding conflict between the primary first radio and the secondary radio.

10. The processor of claim 9, wherein the secondary radio is a low power receive-only radio.

11. The processor of claim 9, wherein the first wireless protocol is Wi-Fi, and wherein the second wireless protocol is Bluetooth.

12. The processor of claim 9, wherein the secondary radio shares a data path to the antenna with the first radio.

13. The processor of claim 12, the operations further comprising:

determining at least one of amplifier settings of an amplifier on the data path or antenna settings.

14. The processor of claim 9, wherein selecting the first radio or the secondary radio to perform the action is based on at least one of a priority of the action, a type of the action, or a power consumption of the action.

15. A method for a wireless device communicatively coupled a first radio that operates according to a first wireless protocol and a second radio that operates according to a second wireless protocol, the method comprising:

determining that the first radio has received a grant to an antenna of the wireless device, wherein the wireless device comprises a secondary radio configured to perform actions according to the first and second wireless protocols;

selecting the first radio or the secondary radio to perform an action according to the first wireless protocol; and instructing the selected one of the first radio and the secondary radio to perform the action, thereby avoiding conflict between the first radio and the secondary radio.

16. The method of claim 15, wherein the secondary radio is a low power receive-only radio.

17. The method of claim 15, wherein the first wireless protocol is Wi-Fi.

18. The method of claim 15, wherein the secondary radio shares a data path to the antenna with the first radio.

19. The method of claim 18, further comprising:

determining at least one of amplifier settings of an amplifier on the data path or antenna settings.

20. The method of claim 15, wherein determining that the first radio has received the grant to the antenna comprises:

receiving the grant from a coexistence arbitrator of the wireless device.

* * * * *

UNITED STATES PATENT AND TRADEMARK OFFICE
CERTIFICATE OF CORRECTION

PATENT NO. : 11,843,403 B2
APPLICATION NO. : 17/484620
DATED : December 12, 2023
INVENTOR(S) : Shehla S. Rana, Yang Yu and Rajneesh Kumar

Page 1 of 1

It is certified that error appears in the above-identified patent and that said Letters Patent is hereby corrected as shown below:

In the Claims

Column 16, Line 6, in Claim 9, after "the" delete "primary".

Signed and Sealed this
Twenty-third Day of April, 2024

Katherine Kelly Vidal
*Director of the United States Patent and Trademark Office*